US00RE44434E

(19) United States
(12) Reissued Patent
Swindal

(10) Patent Number: US RE44,434 E
(45) Date of Reissued Patent: Aug. 13, 2013

(54) OPTICAL POSITION MEASURING SYSTEM AND METHOD USING A LOW COHERENCE LIGHT SOURCE

(75) Inventor: J. Christian Swindal, Ridgefield, CT (US)

(73) Assignee: ASML Holding N.V., Veldhoven (NL)

(21) Appl. No.: 13/601,331

(22) Filed: Aug. 31, 2012

Related U.S. Patent Documents

Reissue of:
(64) Patent No.: 7,573,580
Issued: Aug. 11, 2009
Appl. No.: 10/713,212
Filed: Nov. 17, 2003

(51) Int. Cl.
*G01B 11/02* (2006.01)
*G01B 11/14* (2006.01)

(52) U.S. Cl.
USPC ..... 356/499; 356/401; 356/620; 356/622

(58) Field of Classification Search
USPC ..... 356/499, 508, 497, 498, 488, 494, 356/521, 399–401, 616–622, 479, 482, 509
See application file for complete search history.

(56) References Cited

U.S. PATENT DOCUMENTS

| | | | |
|---|---|---|---|
| 4,821,277 | A | 4/1989 | Alphonse et al. |
| 5,114,236 | A | 5/1992 | Matsugu et al. |
| 5,155,370 | A | 10/1992 | Osawa et al. |
| 5,294,980 | A | 3/1994 | Matsugu et al. |
| 5,428,445 | A | 6/1995 | Holzapfel |
| 5,481,363 | A | 1/1996 | Matsugu et al. |
| 5,648,658 | A | 7/1997 | Holzapfel et al. |
| 5,917,604 | A | 6/1999 | Dirksen et al. |
| 6,404,499 | B1 | 6/2002 | Stoeldraijer et al. |
| 6,628,406 | B1 | 9/2003 | Kreuzer |
| 6,741,335 | B2 | 5/2004 | Kinrot et al. |
| 2002/0027662 | A1 | 3/2002 | Hansen |

FOREIGN PATENT DOCUMENTS

| | | | |
|---|---|---|---|
| JP | 02-269902 | | 11/1990 |
| JP | 02-269902 | A | 11/1990 |
| JP | 03-067103 | | 3/1991 |
| JP | 03-067103 | A | 3/1991 |
| JP | 05-133769 | A | 5/1993 |
| JP | 2003-324057 | | 11/2003 |
| JP | 2003-324057 | A | 11/2004 |

OTHER PUBLICATIONS

U.S. Appl. No. 12/538,412, J. Christian Swindal, "Optical Position Measuring System and Method Using a Low Coherence Light Source," filed Aug. 10, 2009.
Non-Final Rejection mailed Nov. 23, 2005 for U.S. Appl. No. 10/713,212, filed Nov. 17, 2003; 9 pages.

(Continued)

*Primary Examiner* — Tarifur Chowdhury
*Assistant Examiner* — Jonathan Hansen
(74) *Attorney, Agent, or Firm* — Sterne, Kessler, Goldstein & Fox P.L.L.C.

(57) ABSTRACT

An optical position measuring system (e.g., an interferometer) includes a superluminescent device (SLD) (e.g., a laser diode having at least one anti-reflective coated surface) and a detector. The SLD generates a light beam having a short coherence length (e.g., about 0.1 mm to about 0.5 mm, less than the optical path length of an optical element, and/or less than a spacing between optical elements). Through use of the short coherence length light beam, interference effects from spurious or ghost reflections that exist in conventional position measuring systems are substantially reduced or eliminated.

13 Claims, 8 Drawing Sheets

(56) References Cited

OTHER PUBLICATIONS

Final Rejection mailed Mar. 10, 2006 for U.S. Appl. No. 10/713,212, filed Nov. 17, 2003; 10 pages.
Notice of Allowance mailed Aug. 16, 2006 for U.S. Appl. No. 10/713,212, filed Nov. 17, 2003; 7 pages.
Non-Final Rejection mailed Jan. 18, 2007 for U.S. Patent Application No. 10/713,212, filed Nov. 17, 2003; 14 pages.
Final Rejection mailed Sep. 13, 2007 for U.S. Appl. No. 10/713,212, filed Nov. 17, 2003; 15 pages.
Non-Final Rejection mailed Nov. 6, 2007 for U.S. Appl. No. 10/713,212, filed Nov. 17, 2003; 15 pages.
Final Rejection mailed Apr. 23, 2008 for U.S. Appl. No. 10/713,212, filed Nov. 17, 2003; 18 pages.
Ex Parte Quayle Action mailed Nov. 20, 2008 for U.S. Appl. No. 10/713,212, filed Nov. 17, 2003; 6 pages.
Notice of Allowance mailed Apr. 1, 2009 for U.S. Appl. No. 10/713,212, filed Nov. 17, 2003; 6 pages.

OPTICAL POSITION MEASURING SYSTEM AND METHOD USING A LOW COHERENCE LIGHT SOURCE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is related to optical position measuring, particularly using interferometric techniques.

2. Background Art

Advancement in the accuracy of optical position measuring systems has increased dramatically over the last few years as tolerances for determining positioning have become tighter. This is especially true in a lithographic environment. As feature sizes have become dramatically smaller, very accurate alignment systems are necessary to ensure proper overlay of patterns on a substrate, wafer, flat panel display, etc. The alignment systems are used to measure current pattern position in order to accurately position the substrate and/or substrate stage for subsequent exposure of patterns. This is because even small alignment errors in pattern-to-pattern exposure can make devices inoperable.

One method of measuring position that achieves very high accuracy is interferometry using coherent light. Interferometry is based on combining two separate but coherent light beams to form an interference pattern or signal. A measuring beam interacts with a target being measured, such as a diffraction grating. Interaction with the target generates two measurement beams, which have a phase relationship that depends on the position of the target. The two measurement beams are combined to form an interference pattern or signal, which is detected and analyzed. Thus, using interferometric techniques, various relationships between the two beams, such as intensity difference and/or phase difference, for example, can be used to determine a position of a target, or portions thereof, being measured.

Coherent light sources (e.g., lasers, or the like) are used in interferometry. When using coherent light, one problem that can affect measurement accuracy is coherent interference caused by ghost or spurious reflections from various surfaces interfering with the measuring beam. As seen in FIGS. 1 and 2, these reflections can be from optical elements used to direct light to and from the target (FIG. 2).

As seen in FIGS. 1 and 2, an illumination beam 100 is directed to target 104, which may be on a wafer 102. A desired portion of a measurement beam has a positive first order component 106 (+1$^{st}$ order) and a negative first order component 108 (−1$^{st}$ order) after interaction with the target 104. It is to be appreciated that higher order components, such as 3$^{rd}$, 5$^{th}$, 7$^{th}$, etc., may also be desired and measured. However, spurious or ghost reflections 110 and 112 (FIG. 1) or 200 (FIG. 2) are also generated. Spurious reflection 110 has an initial direction from target 104 towards optical element 114, and then reflects from optical element 114 back towards target 104 to form spurious reflection 112. For example, spurious reflections 110 and 112 are generated from the +1$^{st}$ order measurement beam at optical element 114, while spurious reflection 200 is generated from the illuminating beam 100. The spurious or ghost reflection 112 interferes with the minus 1$^{st}$ order measurement beam 108, from target plane all the way to the detection plane, including for example at a region 116 circled in FIG. 1. Similarly, spurious reflection 200 interferes with positive 1$^{st}$ order measurement beam 106 from the target plane all the way to the detection plane, including at a region 202 in FIG. 2.

Using phase modulators to phase modulate a coherent light signal can substantially reduce or eliminate contributions to the interferometric measurement from the spurious reflections. However, phase modulators can be costly, in both money and space on the sensor, and can be complex to implement as tolerance levels continue to increase.

Therefore, what is needed is a system and method that allow for a substantial reduction and/or elimination of coherence with spurious or ghost reflections in relation to the measurement beams in optical position measuring, particularly interferometry, that are less complex and costly than conventional systems and methods.

BRIEF SUMMARY OF THE INVENTION

Embodiments of the present invention provide a system in an exposure portion of a lithography tool. The system includes a system support, a superluminescent device (SLD) coupled to the support, and a sensor coupled to the support. Light output by the SLD and diffracted from a target is received by the sensor and combined so as to measure a position of the target.

Other embodiments of the present invention provide a method of reducing unwanted reflections during interferometric alignment measuring in a lithography tool. The method includes the following steps. Diffracting a beam of light from a superluminescent device from a target. Combining the first and second diffracted beams. A final step can be to determine an interference pattern generated from the combining step.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
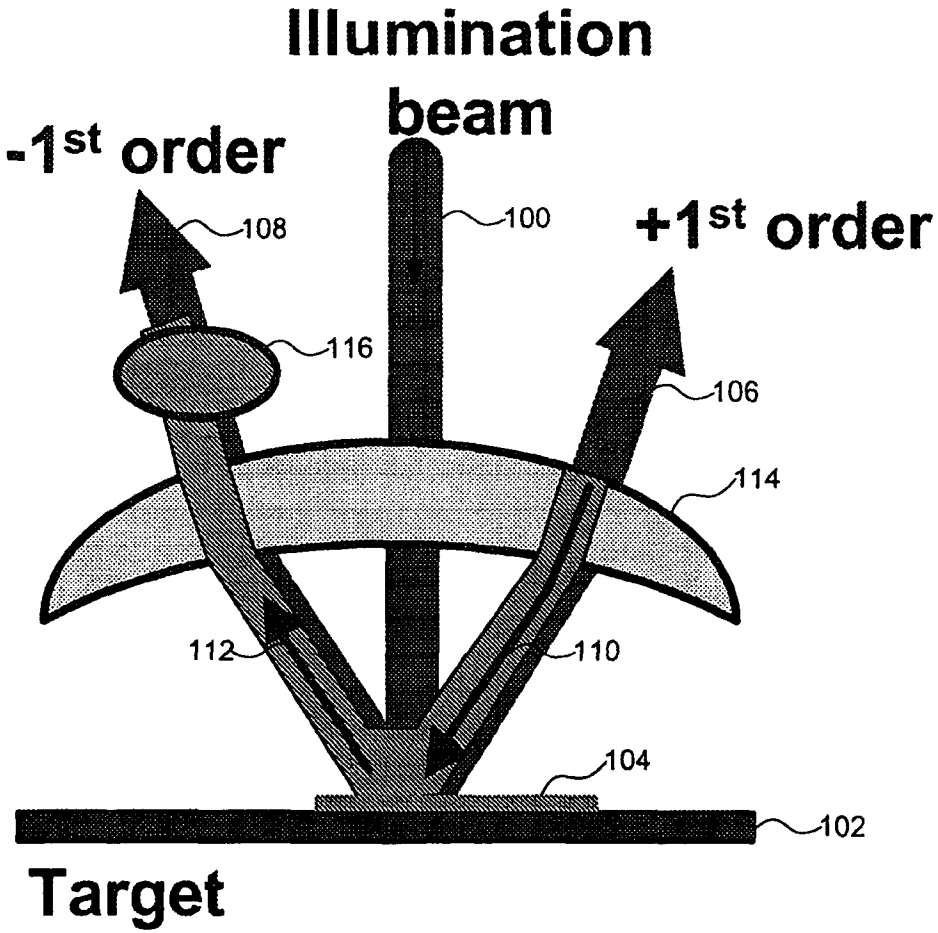

FIG. 1 shows a portion of a position measuring system having optical element induced coherence offset after interaction with a target.

Figure 2:
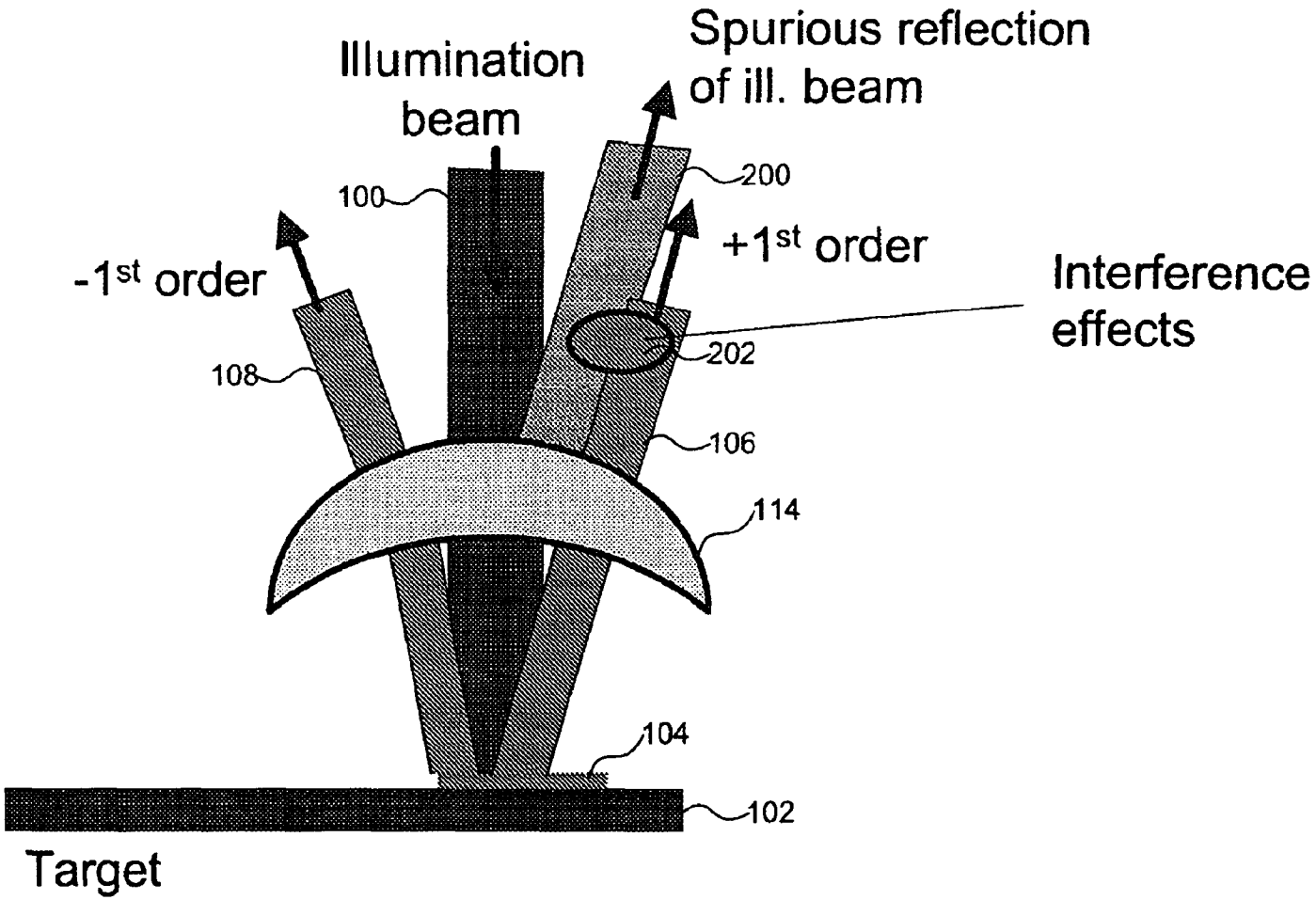

FIG. 2 shows a portion of a position measuring system having optical element induced coherence offset before interaction with a target.

Figure 3:
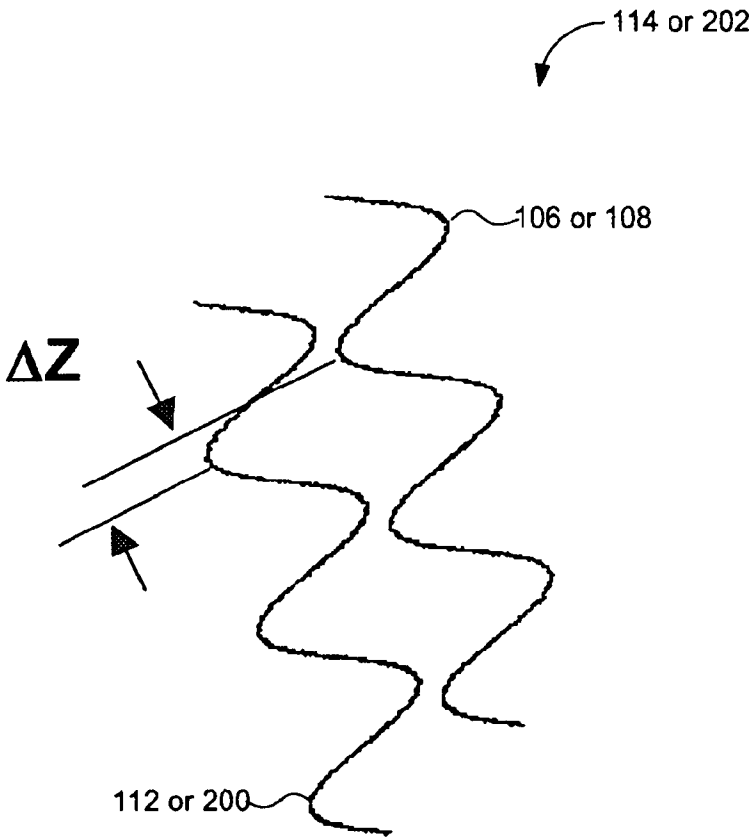
FIG. 3 shows a phase comparison of signal 108/112 or 106/200. A phase difference between a similar point of 108/112 or 106/200 is shown as ΔZ.

FIG. 3 shows a phase relationship between a desired signal and a spurious signal.

Figure 4:
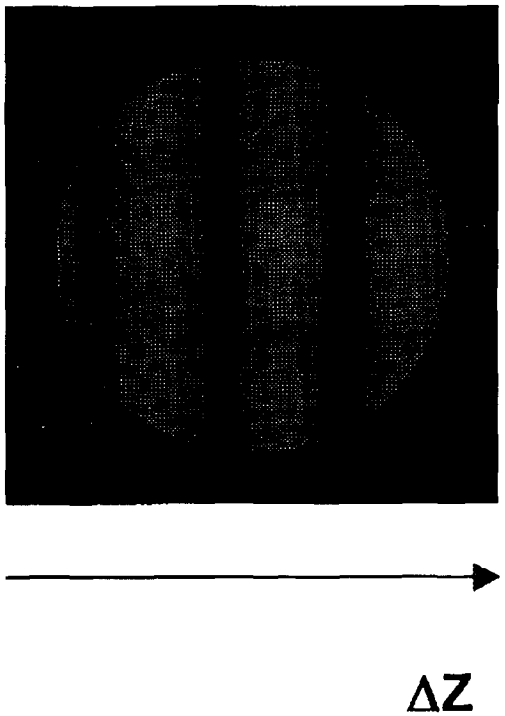
FIG. 4 shows an interference pattern generated when the spurious signal 112 or 200 interferes with the measuring beam 108 or 106, respectively.

FIG. 4 shows an interference pattern generated from combining the desired and spurious signals of FIG. 3, for various ΔZ.

Figure 5:
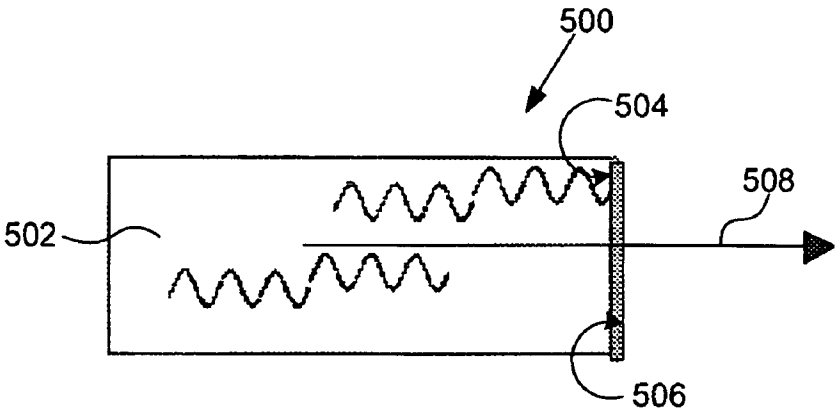

FIG. 5 shows a superluminescent device according to embodiments of the present invention.

Figure 6:
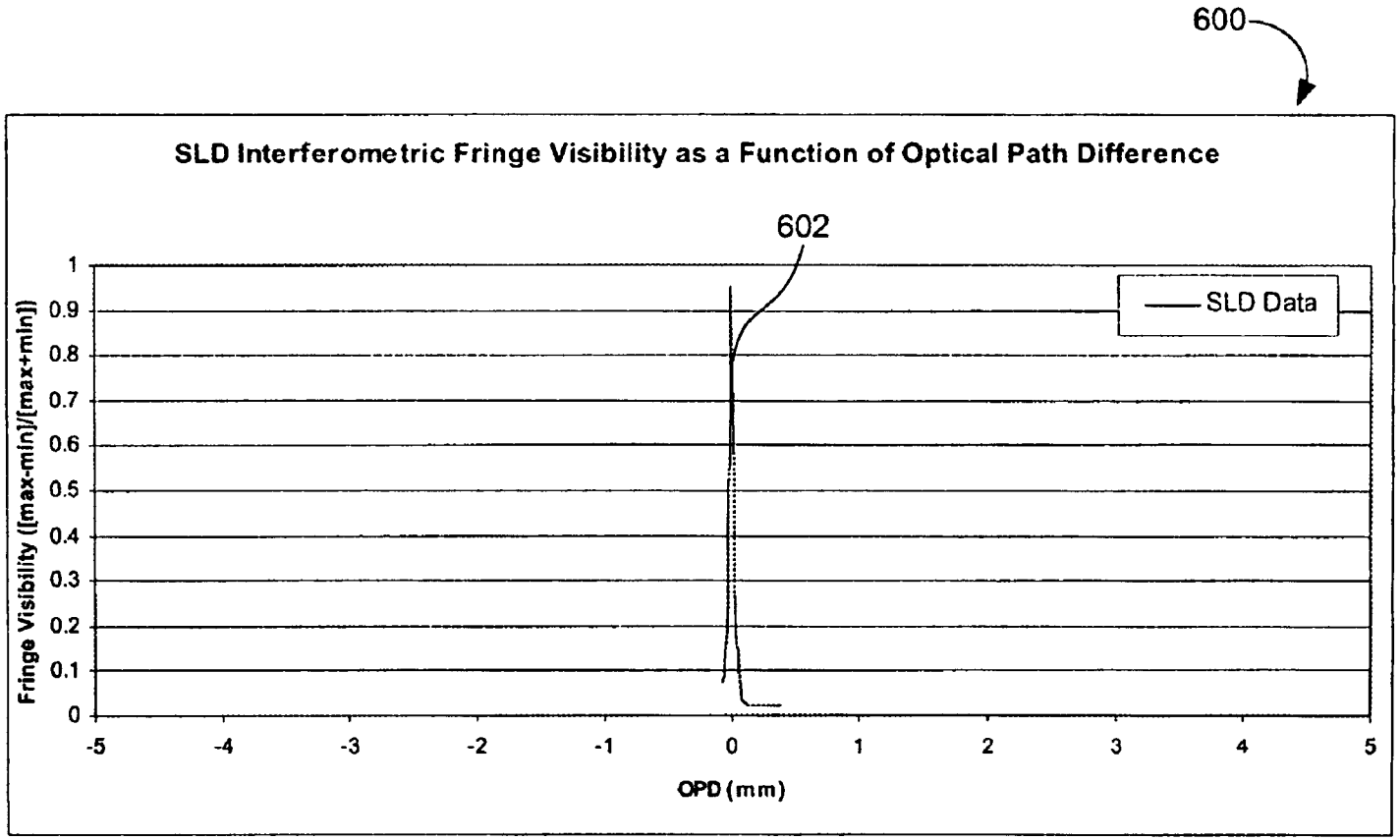

FIG. 6 is a graph showing interferometric fringe visibility data for varying optical path differences for an SLD light source according to an embodiment of the present invention.

Figure 7:
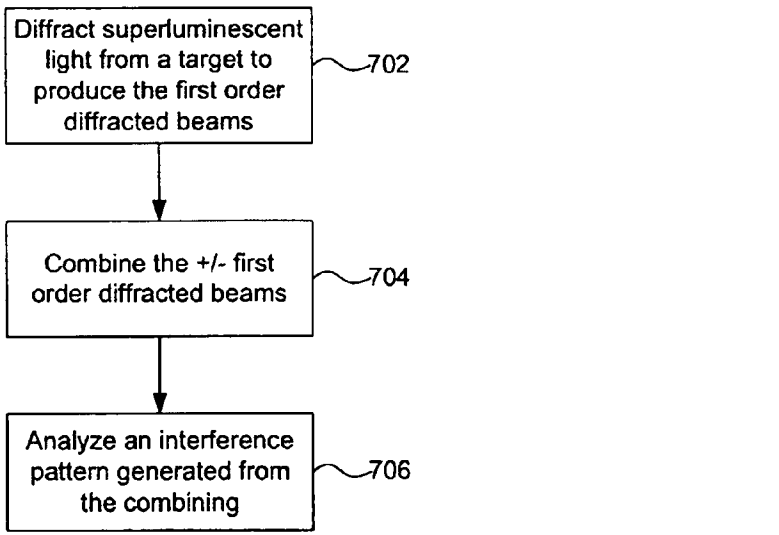

FIG. 7 is a flowchart depicting a method of performing optical position measuring using a superluminescent device according to embodiments of the present invention.

Figure 8:
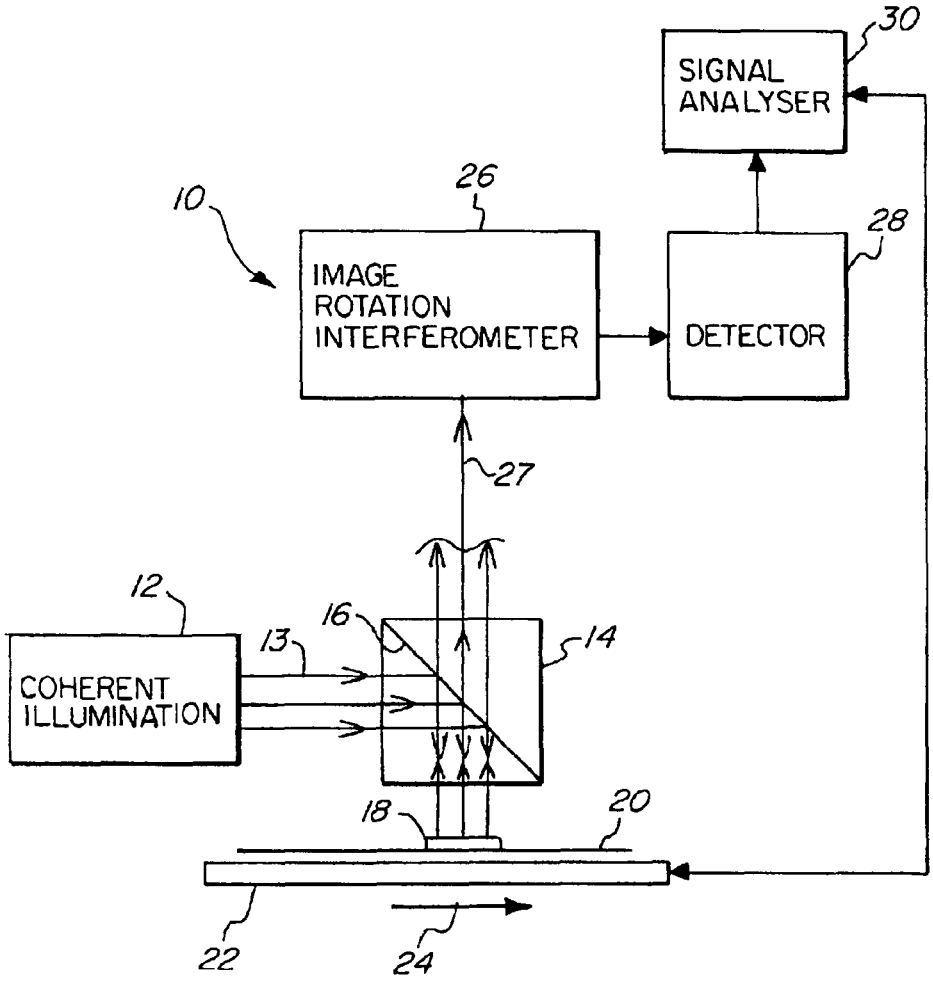

FIG. 8 shows an exemplary system.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide an optical position measuring system (e.g., an interferometer) including a superluminescent device (SLD) (e.g., a laser diode having an anti-reflective coated inner wall) and a detector. The SLD generates a light beam having a short coherence length (e.g., about 0.1 mm to about 0.5 mm, less than the optical path length of an optical element, and/or less than a spacing between optical elements). Through use of the short coherence length light beam, spurious or ghost reflections that exists in conventional position measuring systems are substantially incoherent with the desired measurement beams, thus substantially reducing or eliminating all together the interference effects that would otherwise introduce error in the determination of the target position.

Superluminescent Device

FIG. 5 shows a superluminescent light source 500 according to embodiments of the present invention. Superluminescent device 500 (SLD) can be a laser diode structure having an emitting volume 502 and an anti-reflecting portion 504 on a surface 506. This configuration can allow for amplified spontaneous emission resulting in light beam 508 (e.g., a light beam with low coherence). In one example, partially coherent light beam 508 can have a longitudinal coherence length in the range of about 0.1 mm to about 0.5 mm. It is to be appreciated that other coherence lengths are possible using various SLD 500's having various parameters, as would be apparent to one of ordinary skill in the art.

A laser diode is merely an exemplary device that can be used as SLD 500. Other devices (known or developed in the future) that can exhibit the short coherence length desired are also contemplated within the scope of the present invention.

It is to be appreciated that a desired coherence length for light beam 508 can also be determined from a particular application using light beam 508. Once determined, the desired coherence length can be utilized to manufacture SLD 500. For example, a coherence length can be determined from an optical path difference (e.g., a thickness, etc.) of an optical element (e.g., a lens, or the like) in an optical position measuring system (e.g., an interferometer) that causes spurious reflections. As another example, a coherence length can be determined from a distance between optical elements (e.g., lenses, or the like) in an optical position measuring system that cause spurious reflections.

FIG. 6 shows a graph 600 of interferometric fringe visibility data for an output value 602 of light beam 508 according to embodiments of the present invention. In one example, SLD 500 has a wavelength of about 780 nm and a power output of approximately 4.5 mW. It is to be appreciated that other wavelengths and power outputs are also contemplated within the scope of the present invention.

An exemplary system that can include SLD 500 is shown in FIG. 8. SLD 500 can be used as coherent illumination source 12. Such a system is further described in U.S. Pat. No. 6,628,406 to Kreuzer (the 405 patent), which is incorporated herein by reference in its entirety.

Method of Using a Superluminescent Light Source for Optical Position Measuring FIG. 7 shows a flowchart depicting a method 700 of reducing the interference effects resulting from unwanted reflections during interferometric alignment measuring in a lithography tool according to an embodiment of the present invention. Method 700 can be performed by the system in the '406 patent, or any other systems. In step 702, a first beam of light from a superluminescent device is diffracted off a target to produce +/− first order diffracted beams (and higher order diffracted beams) In step 704, the +/− first order diffracted beams are combined. In step 706, an interference pattern is generated from said combining step.

Thus, by performing this method, through use of the short coherence length light beam, interference from spurious or ghost reflections that exists in conventional position measuring systems is substantially reduced or eliminated all together.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A position determining system that measures a position of an alignment mark on a substrate, comprising:

a superluminescent device (SLD) that transmits a light beam having a longitudinal coherence length based on at least one optical parameter associated with one or more optical elements of the position determining system, wherein the longitudinal coherence length substantially eliminates ghost or spurious reflections from the one or more optical elements present during exposure of a pattern in a lithography tool;

a lens system that directs the light beam to be diffracted from the alignment mark on a wafer, the diffracted light causing the ghost or spurious reflections through its interaction with the lens system;

an interferometer configured to use the diffracted light to determine a position of the alignment mark to produce a control signal related to the determined position, wherein the interferometer is configured to determine the position of the alignment mark using an interference pattern; and a positioning system configured to align the substrate to receive the subsequent pattern based on the control signal, wherein the positioning system is configured to use the control signal to substantially reduce *effect of* the ghost or spurious reflections during receipt of the subsequent pattern by the substrate.

2. The system of claim 1, wherein the SLD is configured to produce the longitudinal coherence length of the light beam that is less than a smallest distance between first and second ones of the lenses in the lens system.

3. The system of claim 1, wherein the SLD comprises a laser diode having an anti-reflection coating on at least one surface.

4. The system of claim 1, wherein the SLD is configured to produce the longitudinal coherence length of the light beam that is about 0.5 mm or less.

5. A position determining system that measures a position of an alignment mark on a substrate, comprising:

a superluminescent device (SLD) configured to produce a light beam having a longitudinal coherence length based on at least one optical parameter associated with one or more optical elements of the position determining system that substantially eliminates interference between at least one of ghost or spurious reflections from the one or more optical elements present during exposure of a pattern in a lithography tool;

a lens system that directs the light beam to be diffracted from the alignment mark on a wafer, the diffracted light causing the ghost or spurious reflections through its interaction with the lens system;

an interferometer configured to use the diffracted light to determine a position of the alignment mark to produce a control signal related to the determined position, wherein the interferometer is configured to determine the position of the alignment mark using an interference pattern; and a positioning system configured to align the substrate to receive a subsequent pattern based on the control signal, wherein the position system is configured to use the control signal to substantially reduce *effect of* the ghost or spurious reflections during receipt of the subsequent pattern by the substrate.

6. A position measuring method that measures a position of an alignment mark on a substrate, comprising:

determining a longitudinal coherence length for superluminescent light based on at least one optical parameter associated with one or more optical elements of a position determining system, wherein the longitudinal coherence length substantially eliminates ghost or spurious reflections from the one or more optical elements present during exposure of a pattern in a lithography tool;

generating and transmitting the superluminescent light having the longitudinal coherence length;

directing the superluminescent light to be diffracted from the alignment mark on a wafer using a lens system;

diffracting the superluminescent light from the alignment mark to produce +/− first order diffracted beams;

directing the +/− first order diffracted beams onto a combining element using the lens system, the diffracted light causing the ghost or spurious reflections through its interaction with the lens system;

combining the +/− first order diffracted beams using the combining element;

determining a position of the alignment mark based on an interference pattern generated from the combining step;

generating a control signal based on the determined position; and positioning the substrate to properly align the substrate to receive a subsequent pattern based on the control signal, wherein the control signal generated from positioning the substrate is used to substantially reduce *effect of* the ghost or spurious reflections during receipt of the subsequent pattern by the substrate.

7. The method of claim 6, wherein the generating step comprises using a superluminescent device (SLD) to generate the superluminescent light.

8. The method of claim 6, wherein the generating step comprises using a laser diode having at least one anti-reflective surface to generate the superluminescent light.

9. The method of claim 6, wherein the longitudinal coherence length of the superluminescent light is about 0.5 mm or less.

10. The method of claim 6, wherein the longitudinal coherence length of the light beam is less than a smallest distance between first and second ones of the lenses in the lens system.

11. The method of claim 6, wherein the longitudinal coherence length of the light beam is less than a smallest thickness of one of the lenses in the lens system.

12. A system, comprising:

a superluminescent device (SLD) configured to transmit a light beam;

a lens system configured to direct the light beam to be diffracted from the alignment mark on a wafer, the diffracted light causing ghost or spurious reflections through its interaction with the lens system;

an interferometer configured to use the diffracted light to determine a position of the alignment mark to produce a control signal related to the determined position, wherein the interferometer is configured to determine the position of the alignment mark using an interference pattern; and a positioning system configured to align the substrate to receive a subsequent pattern based on the control signal, wherein the positioning system is configured to use the control signal to substantially eliminate *effect of* the ghost or spurious reflections during receipt of the subsequent pattern by the substrate.

13. An interferometric measuring device, comprising:

a laser diode configured to generate a beam of radiation having a coherence length of about 0.1 to 0.5 mm and configured to direct the beam of radiation to reflect from a diffractive alignment target to form first and second beams that are out of phase with respect to each other and that interfere with each other to form an interferogram, an interference pattern, or interference fringes; and a sensor configured to receive the interferogram, the interference pattern, or the interference fringes and to generate an alignment signal therefrom, wherein the beams of radiation having the coherence length of about 0.1 to 0.5 mm provide for substantial elimination of *effect of* spurious or ghost reflections from optical elements within the system, the optical elements having widths greater than about 0.1 to 0.5 mm, to reduce unwanted additional beams, caused by the spurious or ghost reflections, from interfering with the interferogram, the interference pattern, or the interferometric fringes.

* * * * *